F. A. ROBINSON.
INSULATING ENAMEL.
APPLICATION FILED NOV. 7, 1914.
1,170,000.
Patented Feb. 1, 1916.
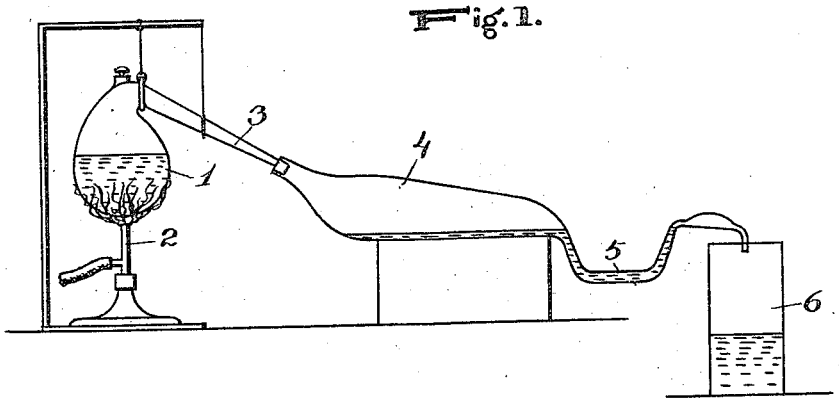
Fig. 1.
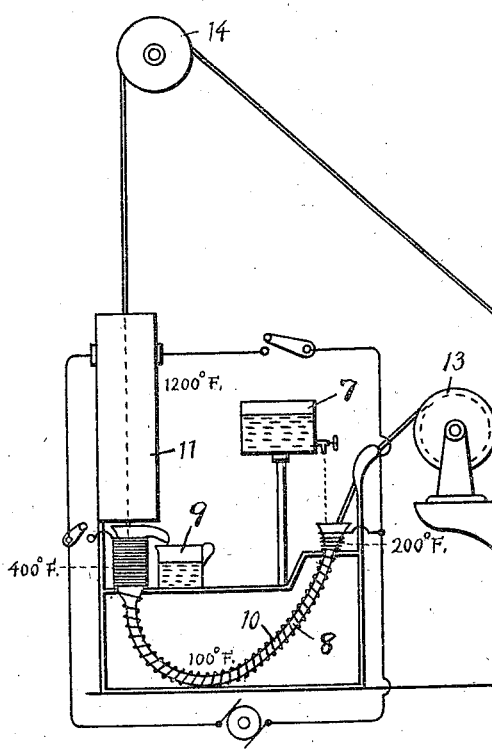
Fig. 2.
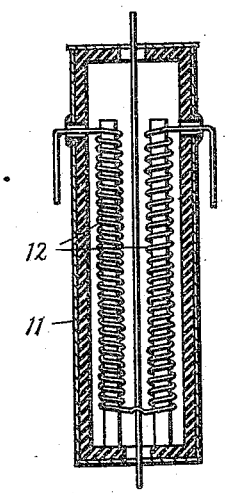
Fig. 3.
Fig. 4.
WIRE
INSULATION
Witnesses
S. Mandelbaum
Etta Zinke
Inventor
Frank A. Robinson
By Frederick I. Allen
Attorney

UNITED STATES PATENT OFFICE.

FRANK A. ROBINSON, OF AUBURN, NEW YORK, ASSIGNOR TO DAVID W. ARMISTEAD, OF AURORA, NEW YORK.

INSULATING-ENAMEL.

1,170,000.  Specification of Letters Patent.  Patented Feb. 1, 1916.

Application filed November 7, 1914. Serial No. 870,857.

*To all whom it may concern:*

Be it known that I, FRANK A. ROBINSON, a citizen of the United States, and a resident of the city of Auburn, in the county of Cayuga and State of New York, have invented certain new and useful Improvements in Insulating-Enamels, of which the following is a specification.

The invention relates to an improved insulating enamel, designed to be used more particularly in connection with electric wires and similar conductors, its preparation and application being facilitated by means of apparatus forming the subject matter of my pending application No. 683,279, filed March 12, 1912.

The main object is to provide a comparatively inexpensive enamel which may be economically and expeditiously applied to such conductors and other materials, and when so applied will be tenacious, elastic and flexible and capable of a high degree of electrical and heat resistance. In other words, I have sought to make a thin insulation coating which will permit such conductors to be wound in short turns or brought into close contact with other conductors without liability to short circuiting or disintegration of the enamel.

In the following description of the drawings, Figure 1 is a diagrammatic view of a portion of one form of apparatus for carrying out the first step of a process of making this insulating material, Fig. 2 is a diagrammatic view of an apparatus for completing the process, Fig. 3 is an enlarged sectional view of the electric oven shown in Fig. 2, and Fig. 4 is a detail view of a portion of a wire with my insulating enamel thereon.

The enamel, briefly stated, consists of a thin, hard and flexible product derived from a cetaceous or pinnipedic base, preferably walrus or whale oil, which has first been rapidly heated to a temperature of about 900 degrees Fahrenheit, throwing off the volatile constituents so as to leave a somewhat dense residue, which has afterward been brought to a higher temperature, of about 1200 degrees, to convert it into a hardened enamel.

In the preparation of this insulating material, the raw oil is placed in a retort 1, and said retort is heated by means of a Bunsen burner 2, or equivalent heater capable of rapidly raising the temperature of the oil to approximately 900 degrees Fahrenheit. The volatile constituents which are liberated from the oil under ebullition are carried off through a suitable pipe 3, leading from the upper portion of the retort 1 into a relatively large condensing chamber 4, where the greater portion of the vapors are condensed, and then flow through a suitable trap 5 into a collecting chamber 6, the trap 5 serving as a liquid seal to prevent the entrance of air or other vapors to the retort, it being understood that the connections between the retort and condenser 4, and also between the condenser and receptacle 6, are substantially air tight.

I have found that in the treatment of whale oil or walrus oil a heat of approximately 900 degrees Fahrenheit is sufficient to drive off the volatile constituents, and that when this degree of heat is exceeded the residue becomes too sluggish for even distribution over the surface of a wire which may be drawn therethrough; while, on the other hand, if the degree of heat is much lower than that specified, it is inefficient to drive off the objectionable volatile parts, the residue being too thin to form a coating of uniform thickness and containing matter which causes inefficient insulation. These results are believed to be peculiar to whale and walrus oil and oils from similar animals, and have been determined only by actual tests, without any effort to ascertain the chemical actions or reactions, the object being to drive off the volatile constituents as rapidly as possible and to leave a residue of such consistency that it will adhere to a wire or other conductor in the form of a thin coating of uniform thickness, free from foreign matter and of such character that, upon being subjected to an ascertained high temperature of about 1200 degrees, it will provide a thin but exceedingly hard and highly flexible insulation, of high electrical resistance. In completing this insulator this residue is applied to a conductor or other supporting body, and particularly to wire, in the form of a thin coating, which is resubjected to heat, increasing by steps in intensity from about 200 degrees Fahrenheit upward, until it reaches a temperature of approximately 1200 degrees Fahrenheit, whereby it is converted into a hard and dry covering, which constitutes the finished enamel.

In Fig. 2 of the drawings I have shown an apparatus which may be used for the application to a wire expeditiously and economically. The residue, prepared as previously described, is removed from the retort 1 into a suitable receptacle 7, from which it is allowed to drip at normal atmospheric temperature into one end of a U-shaped tube 8, the opposite end of said tube being provided with an overflow, discharging into a receptacle 9, the object being to maintain a fresh supply of said residue in the tube 8, and to keep said tube substantially filled. This tube is made of heat conducting material, and is surrounded by an electric heating coil 10, extending from end to end thereof. The opposite ends of this coil, near the inlet and outlet, are wound close together, while the intermediate portions are of coarser winding, thereby heating the ends of the tube to a greater degree of temperature than said intermediate portion, the number of turns of the close winding at the outlet end being usually greater than that at the inlet end of the tube, so as to heat the outlet end to a greater degree of temperature than that of the inlet end, for certain purposes of advantage in connection with a wire conductor. These windings of the resistance coil, and the current supplied thereto, are regulated in such manner as to cause the coil near the inlet to heat this portion of the tube and its contents to a temperature of approximately 200 degrees Fahrenheit, while the greater portion of the tube intermediate the ends is adapted to be heated to a less degree of temperature, of approximately 100 degrees Fahrenheit, the winding at the outlet end being adapted to heat the contents of this portion of the tube to approximately 400 degrees Fahrenheit. This heating of the residue in the entrance end of the tube 8 to approximately 200 degrees Fahrenheit is for the purpose of thinning the oil so that it will distribute itself more readily upon the wire upon its initial entrance into the tube, and, as the wire continues to pass through the intermediate portion of said tube, it is desirable to lower the temperature to approximately 100 degrees Fahrenheit, so as to cause the oil to adhere and accumulate more gradually on the wire and still preserve an even distribution of uniform thickness. The treatment thus far determines approximately the thickness of the coating, and in order that such thickness may not be materially increased during the further transit of the wire through the outlet end of the tube, the temperature of the oil at the outlet is materially increased, to approximately 400 degrees Fahrenheit, thereby thinning the oil to such an extent as to allow the wire, with the coating thereon, to pass through without taking on any more than enough to assure uniformity of thickness of the coating. Then, by immediately but slowly passing the coated wire through the oven 11, having a temperature of approximately 1200 degrees Fahrenheit, it is found that the coating will be uniformly hardened without liability of carbonizing or of destroying the elasticity or flexibility of the enamel so produced. These differential degrees of temperature are found by experiment to be most efficient in treating this particular kind of oil for the purpose in view, and no effort has been made to ascertain why these particular temperatures are necessary, beyond the fact that very wide deviations from such temperatures will prevent the formation of a hard yet highly flexible enamel, having a high degree of electrical resistance.

Immediately above the outlet end of the tube 8, containing the insulating material, is an oven 11, containing an electric heater and 12 which is employed to heat the oven and the coated conductor therein to a still higher temperature, of approximately 1200 degrees Fahrenheit, more or less, said oven being provided with an opening therethrough through which the coated wire may be drawn.

The apparatus shown is adapted for covering electric wires with the enamel, and for this purpose the wire is drawn from a reel 13, through the tube 8, and insulating material therein, and thence upwardly through the oven 11, from which the coated wire is carried over the superposed idler or sheave 14, and connected to a motor driven drum 15. This drum is rotated by means of a worm gear 16 and worm 17, the latter being mounted upon a suitable shaft and operatively connected to an electric motor 18, so as to drive the drum 15 at a very slow speed. It is now clear that, as the wire is drawn through the tube 8, more or less of the insulating material therein will adhere thereto, in the form of a thin coating of uniform thickness. The oven 11 is located in close proximity to this outlet of the tube 8, so that the wire, with the coating thereon, will enter the oven immediately after emerging from the outlet of the tube, and will be hardened to the desired degree by the increased temperature in the oven, thereby forming the finished enamel on the wire.

The movement of the wire conductor, with the coating thereon, through the tube 8 and oven 11, is continuous but very slow, in order that the coating of insulating material may be properly hardened and become a permanent part of the wire, the drum 15 serving to automatically wind the enameled wire thereon and regulating the speed of movement through the tube 8 and oven 11.

In many instances one passage of the electric conductor through the heating conductor 8, and oven 11, will provide sufficient insulation for ordinary purposes, but this operation may be repeated, to increase the thickness of the coating, as many times as desired.

The object of heating the oil in the entrance end of the tube 8 is to reduce its density to a sufficient degree of thinness to allow the wire to be drawn through the tube without displacing large quantities of the oil by the draft of the wire therethrough. This material in its initial state, when entering the tube, is of about the consistency of molasses, and, therefore, if this liquid should be drawn into the tube without heating or reducing it to a sufficient degree of thinness, it would be drawn with the wire through the tube.

The object in lowering the temperature at the center of the tube to approximately 100 degrees Fahrenheit is to render the coating of such consistency as to prevent as far as possible contact of the wire with the walls of the tube while being drawn therethrough. The material in this part of the tube is designed to be somewhat thicker than that at the inlet end, but at a sufficiently high temperature to maintain a degree of thinness of the oil to allow the wire to be drawn readily therethrough without causing any excess quantity of material to follow the wire, the purpose of these two temperatures at the inlet and central portions of the tube being solely to enable the wire, with such coating thereon as may adhere, to be drawn therethrough without breaking or otherwise injuring the latter.

In order that this process may be more clearly understood, it might be stated that in the apparatus used the tube 8 is about thirty-six (36) inches long, and the wire is drawn therethrough at the rate of approximately one-and-one-half (1½) feet per minute, so that the action is very slow. The object in raising the temperature at the outlet of the tube to 400 degrees Fahrenheit, as indicated, is to reduce the material to a degree of thinness sufficient to produce a uniform coating of proper thickness, preparatory to hardening in the oven 11. It is found that, if this wire is drawn through the oil in the tube at a much higher rate of speed, a larger quantity of material will adhere to the wire in passing through the oven, and that the temperature of the oven will be insufficient to harden the coating uniformly. In fact, the demonstrations show that under such conditions the coating will not harden, but will flow back irregularly, forming beads or irregular surface coatings which are not susceptible to hardening by the degree of heat in the oven. It has also been found that this particular material, treated in the manner described in the process for making the enamel, can be hardened to the proper degree without destroying its elasticity and without carbonizing, by passing it through an oven of approximately 1200 degrees Fahrenheit at the slow rate of speed referred to.

It is a peculiarity of the treatment of this particular material that the temperature of approximately 400 degrees Fahrenheit, together with the low rate of speed of movement of the wire through the material at this point, determines the uniformity of thickness of the coating which is most effectively treated for hardening under a temperature of approximately 1200 degrees Fahrenheit in passing through the oven. Another peculiarity is that, owing to the high heat-conductivity of the wire, the heat retained thereby as the coated wire emerges from the oven causes such coating to dry from the core outwardly. It must be remembered this coating must be applied in thin form, to harden properly, and that these wires, in order to be enameled for commercial purposes, should be passed through the apparatus several (three or four) times, each operation increasing the electrical resistance without destroying the elasticity of the enamel or in any way approaching any degree of carbonization. The initial and intermediate temperatures of 200 degrees Fahrenheit at the entrance and 100 degrees Fahrenheit at the middle of the tube are more important in the retreatment of the previously coated wire, that is, in adding additional coatings by passing the wire through a tube a second, third or fourth time.

The insulating material may be supplied in thin sheet form, preferably upon a carrier, as of metal or other substance used in electrical work, by modified means which will readily occur, in view of the above explanation, to those skilled in the art.

What I claim is:

1. An elastic, flexible, insulating material consisting of a hardened preparation of the residuum of oil from a pinnipedic or cetaceous animal.

2. In connection with an electrical conductor, a tenacious, elastic, flexible, hard insulating enamel consisting of a preparation of the residuum of oil from a pinnipedic or cetaceous animal.

3. An insulating material consisting of a preparation of the residuum of oil from a pinnipedic or cetaceous animal, said preparation being fluid and capable of adhering to an electrical conductor and of being dried thereon to hard, flexible condition without carbonization at a temperature of 1200 degrees Fahrenheit.

4. An elastic, flexible, insulating material consisting of a hardened preparation of the residuum of oil from a pinnipedic or cetaceous animal, capable of being subjected to a heat of 1200 degrees Fahrenheit without carbonization or loss of the properties stated.

Signed at the city of Auburn in the county of Cayuga and State of New York this fifth day of November, A. D. 1914.

FRANK A. ROBINSON.

Witnesses:
EMMA J. QUICK,
FREDERICK I. ALLEN.

Copies of this patent may be obtained for five cents each, by addressing the "Commissioner of Patents, Washington, D. C."